United States Patent [19]

MacPherson et al.

[11] 4,166,931
[45] Sep. 4, 1979

[54] MINIATURE BRIDGE LIFTER FOR TELEPHONE LINES

[75] Inventors: William F. MacPherson, Winfield Township, DuPage County, Ill.; Irving M. McNair, Jr., Mendham Township, Morris County, N.J.

[73] Assignee: Bell Telephone Laboratories, Incorporated, Murray Hill, N.J.

[21] Appl. No.: 899,286

[22] Filed: Apr. 24, 1978

[51] Int. Cl.$^2$ .................................... H04M 13/00
[52] U.S. Cl. ........................... 179/35; 179/18 FA
[58] Field of Search ................................ 179/30–36, 179/16 A, 16 AA, 16 F, 17 R, 17 A, 17 E, 18 F, 18 FA, 84 R; 307/130

[56] References Cited

U.S. PATENT DOCUMENTS

| | | | |
|---|---|---|---|
| 2,924,667 | 2/1960 | Hochgraf | 179/35 |
| 3,183,309 | 5/1965 | Hunt | 179/35 |
| 3,189,689 | 6/1965 | Hochgraf | 179/35 |
| 3,278,687 | 10/1966 | Everett | 179/17 A |
| 3,284,575 | 11/1966 | Howard | 179/31 |
| 3,622,709 | 11/1971 | Toaden | 179/18 FA |
| 3,671,676 | 6/1972 | Henry et al. | 179/16 F |
| 3,703,610 | 11/1972 | Ebbe et al. | 179/35 |
| 3,881,068 | 4/1975 | Jones, Jr. et al. | 179/35 |
| 4,049,919 | 9/1977 | Young | 179/18 FA |

Primary Examiner—Gerald Brigance
Attorney, Agent, or Firm—Robert O. Nimtz

[57] ABSTRACT

A miniature electronic bridge lifter for bridged telephone lines which can be mounted directly on the protector unit in the central office includes an impedance inserted serially in each side of the loop for isolating the nonactive loops from the central office termination and for switching to a low impedance connection whenever a party on one of the bridged line connections goes off-hook. A combination semiconductive and resistive voltage divider detects the voltage across the loop. The resistive component is essentially the only cross-coupling between the telephone lines. When the line voltage falls below a preselected threshold, indicating that the connected party has gone off-hook, a switch is operated to bypass the series impedances and establish a low-loss path to the common line.

10 Claims, 2 Drawing Figures

4,166,931

MINIATURE BRIDGE LIFTER FOR TELEPHONE LINES

BACKGROUND OF THE INVENTION

1. Field of the Invention

This invention relates to telephone bridge lifters and, more particularly, to switched impedances for isolating idle ones of a plurality of loops which are connected to a common transmission line.

2. Description of the Prior Art

Two or more subscriber loops are often bridged or connected across a common transmission line to provide party-line service. Such bridging is utilized not only for multiparty service but also for secretarial or answering service and for extension telephones at remote locations. A circuit commonly known as a "bridge lifter" is used to isolate idle loops bridged on the line so as to prevent undesirable loading on the active loops and thereby causing unacceptable transmission loss. When any previously idle loop becomes active by going off-hook, the isolation must be removed and the loop connected to the transmission line without appreciable loss.

Prior art bridge lifters included saturable core inductors such as that described in L. Hochgraf U.S. Pat. No. 2,924,661, granted Feb. 9, 1960. Such inductors are bulky, require substantial mounting space and require associated jumper pairs. An electronic bridge lifter is disclosed in C. E. Jones, Jr. et al U.S. Pat. No. 3,881,068, granted Apr. 29, 1975. This circuit requires the use of high voltage transistors for sensing the off-hook condition and thus is unsuitable for fabrication in integrated circuit form. Moreover, such bridge lifters require at least two resistors bridged across the line to sense a differential current flow and thereby control the switch. These resistors must be moderate in value and contribute substantially to the transmission loss when the lines is in use.

SUMMARY OF THE INVENTION

In accordance with the illustrative embodiment of the present invention, an electronic bridge lifter is provided including a voltage measuring circuit comprising a single resistive and semiconductive voltage divider connected across the loop to sense the voltage on that loop. The resistor value can be very high, limiting transmission loss. The switch control current is obtained from the current flowing through the loop, rather than from the bridge current. The loop voltage is sensed to initiate the switching action, which is thereafter taken over and sustained by the loop current.

In accordance with one feature of the present invention, the switch-operating voltage initially derived from the semiconductive voltage divider is thereafter supplied regeneratively from the loop current. This provides a latching operation which is interrupted only when the subscriber goes back on-hook and thereby interrupts the loop current and hence the switch control current.

Such miniature bridge lifters, particularly in integrated circuit form, can be mounted on existing hardware with only four connection terminals and be operated completely by the normal line voltages. Separate mounting frames and interconnection wiring are therefore not required.

DETAILED DESCRIPTION

Figure 1:
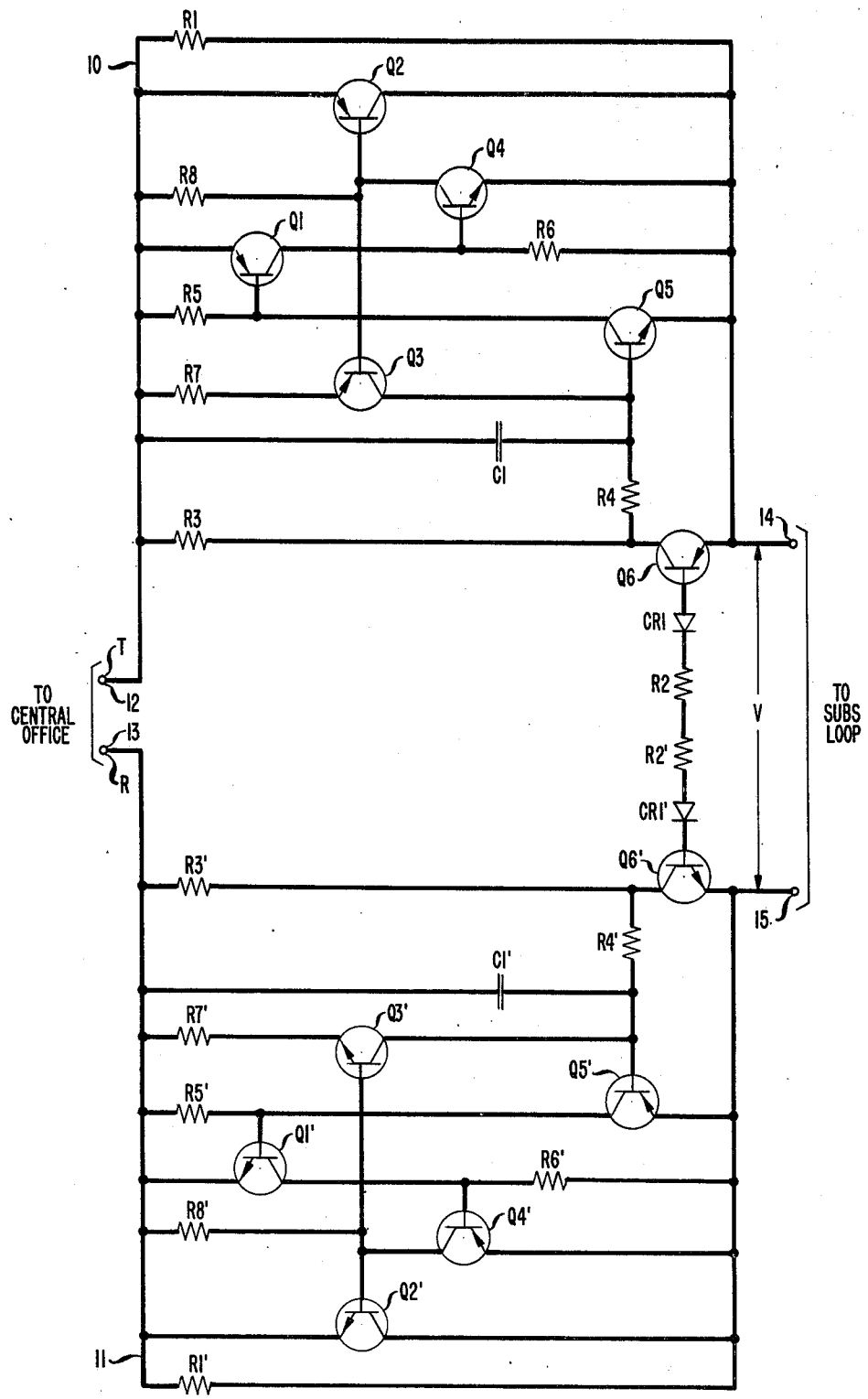
FIG. 1 is a simplified schematic diagram of the miniature bridge lifter in accordance with the present invention.

In FIG. 1 there is shown a simplified schematic diagram of a bridge lifter in accordance with the present invention. The bridge lifter circuit extends from a tip conductor 10 to a ring conductor 11 and includes resistor R1 in tip conductor 10 and resistor R1' in ring conductor 11. The overall bridge lifter circuit has four terminals, 12, 13, 14 and 15, terminals 12 and 13 being connected to the central office equipment and terminals 14 and 15 being connected to the subscriber loop.

The circuit of FIG. 1 includes a switching transistor Q2 which, when enabled by a signal on its base, establishes a low impedance shunt across resistor R1. Similarly, a switching transistor Q2', when enabled, establishes a low impedance shunt across resistor R1'. It will be noted that the upper and lower halves of the circuit of FIG. 1 are identical and corresponding circuit elements have been identified with the same reference numerals, using a "'" to distinguish the components in the lower half of the figure. Since these half circuits are identical and operate in an identical manner, only the upper half of the circuit will be described in detail.

The series circuit including transistor Q6, diode CR1 and resistor R2, and the corresponding elements in the lower half of the circuit constitute a voltage divider across the subscriber loop. The purpose of this voltage divider is to detect the voltage on the loop and thereby ascertain whether the connected subscriber is on-hook and off-hook. It will be noted that this voltage divider is the only cross-coupling path between conductors 10 and 11. Moreover, the values of resistors R2 and R2' are chosen to be sufficiently large that almost the entire voltage drop between conductors 10 and 11 takes place across these resistors. The semiconductive devices in this voltage divider therefore need not be high voltage devices and can be readily fabricated by integrated circuit techniques.

In the on-hook condition, the subscriber telephone set presents a relatively high impedance to the loop and, hence, a large portion of the central office battery voltage appears across this loop. In the off-hook condition the subscriber telephone set presents a much lower impedance, draws a substantial current through the subscriber loop and presents a much lower voltage between terminals 14 and 15. The purpose of the aforementioned voltage divider is to distinguish between these two voltage conditions. For the average subscriber loop the voltage between terminals 14 and 15 is the central office battery supply voltage when the subscriber is on-hook which is reduced by the line drop to a small fraction of the central office battery supply when the subscriber goes off-hook.

The circuit of FIG. 1 detects the transition from the high voltage state on the subscriber loop to the low voltage state and, in response thereto, operates transistors Q2 and Q2', thereby removing resistors R1 and R1' from the talking path. Thus, when the subscriber is on-hook, the isolating resistors R1 and R1' are in the subscriber loop and substantially reduce the loading on any other loops connected to terminals 12 and 13. When the connected subscriber goes off-hook and requires the use of his telephone set, the circuit in FIG. 1 operates to remove resistors R1 and R1' from the circuit and thereby provide a low impedance talking path.

When the subscriber is on-hook and the voltage between terminals 14 and 15 is greater than some threshold value, the base-emitter junctions of transistors Q6 and Q6' are forward biased and the resulting base currents will keep these transistors in saturation. The bulk of the voltage drop between terminals 14 and 15 takes place across resistors R2 and R2'; the semiconductive devices in the voltage divider can therefore be low voltage devices which are easily integrated.

While transistor Q6 is held in a saturated condition by the on-hook loop voltage, the base-emitter junction of transistor Q5 is clamped by transistor Q6 so as to maintain transistor Q5 in the cut-off condition. This prevents the enablement of switching transistor Q2 and thereby maintains the bridging impedance R1 in the circuit. The circuit will continue in this condition until the connected subscriber goes off-hook.

When the connected subscriber goes off-hook, the voltage between terminals 14 and 15 drops substantially. The diodes CR1 and CR1' are selected such that their combined voltage drops exceed the voltage available across terminals 14 and 15 when the subscriber is off-hook. Therefore, no base current will flow through transistors Q6 and Q6', turning off these transistors and unclamping the base of transistor Q5. Current flow through resistors R3 and R4 initiates conduction in transistor Q5. This current is amplified by the gain of transistors Q1 and Q4 and applied to the base of switching transistor Q2. Resistors R5, R6 and R8 provide appropriate base-emitter biases for these transistors.

As the voltage across resistor R1 begins to collapse, the base current for transistor Q5 is supplied from the collector of transistor Q3. The base of transistor Q3 is also driven by the collector of transistor Q4 and thus transistors Q2 and Q3 are driven in parallel.

The currents in transistors Q2 and Q3 are related to each other and this relationship is determined by the value of resistor R7 in the emitter circuit of transistor Q3. These currents are selected to maintain both transistor Q2 and transistor Q3 in saturation throughout the switching transition. This regenerative feedback connection gives the overall circuit a snap action characteristic which would normally result in transistor Q2 operating very rapidly. Since such a fast switching action would introduce an audible click into the talking path, a capacitor C1 is connected across resistor R7 and the collector-emitter path of transistor Q3. As transistor Q3 turns on, its collector current is initially utilized to discharge capacitor C1, thus slowing down the operation of transistor Q5. Once capacitor C1 is fully discharged (a few tenths of a millisecond), transistor Q5 is free to control the switching operation. This slowdown in the switching action is sufficient to reduce ratio frequency interference during ringing to acceptable levels.

It will be noted that only a single cross-connect path exists in the circuit of FIG. 1 between tip conductor 10 and ring conductor 11. This substantially reduces the bridging loss when the subscriber is on-hook and the bridging resistors R1 and R1' are in the circuit. Prior bridge lifters, such as that shown in aforementioned C. E. Jones, Jr. et al U.S. Pat. No. 3,881,068, included a plurality of cross-connected paths and thus increased the bridging loss during the off-hook condition. Moreover, the voltage divider does not require any high voltage transistors and, therefore, renders the circuit compatible with integrated circuit technology. In turn, integration reduces both the size and cost of the bridge lifter.

It should be noted that the voltage divider Q6-CR1-R2-R2'-CR1'-Q6' draws an extremely small shunt current when the loop voltage is high. When the subscriber goes off-hook, the loop voltage drops to a level insufficient to maintain conduction through diodes CR1 and CR1' (and transistors Q6 and Q6'). At the same time, the increasing loop current drives transistors Q2 and Q2' to full conduction by way of the feedback connections through transistors Q3 and Q3', respectively. Although the loop voltage again goes high, the shunting current is always very small and little transmission loss occurs.

Since the circuit of FIG. 1 is directly responsive to loop voltage rather than loop current as are the prior art bridge lifters, this circuit is relatively insensitive to longitudinal currents through the loop. Such currents, caused by leakage or induced from adjacent power lines, tend to operate the bridge lifter while the connected customer is on-hook.

The circuit shown in FIG. 1 will operate properly only if the central office voltage is positive on the tip conductor. Since the circuit must be capable of operation with loop current flowing in either direction due to battery reversal, the circuit of FIG. 2 includes a bi-directional capability.

Figure 2:
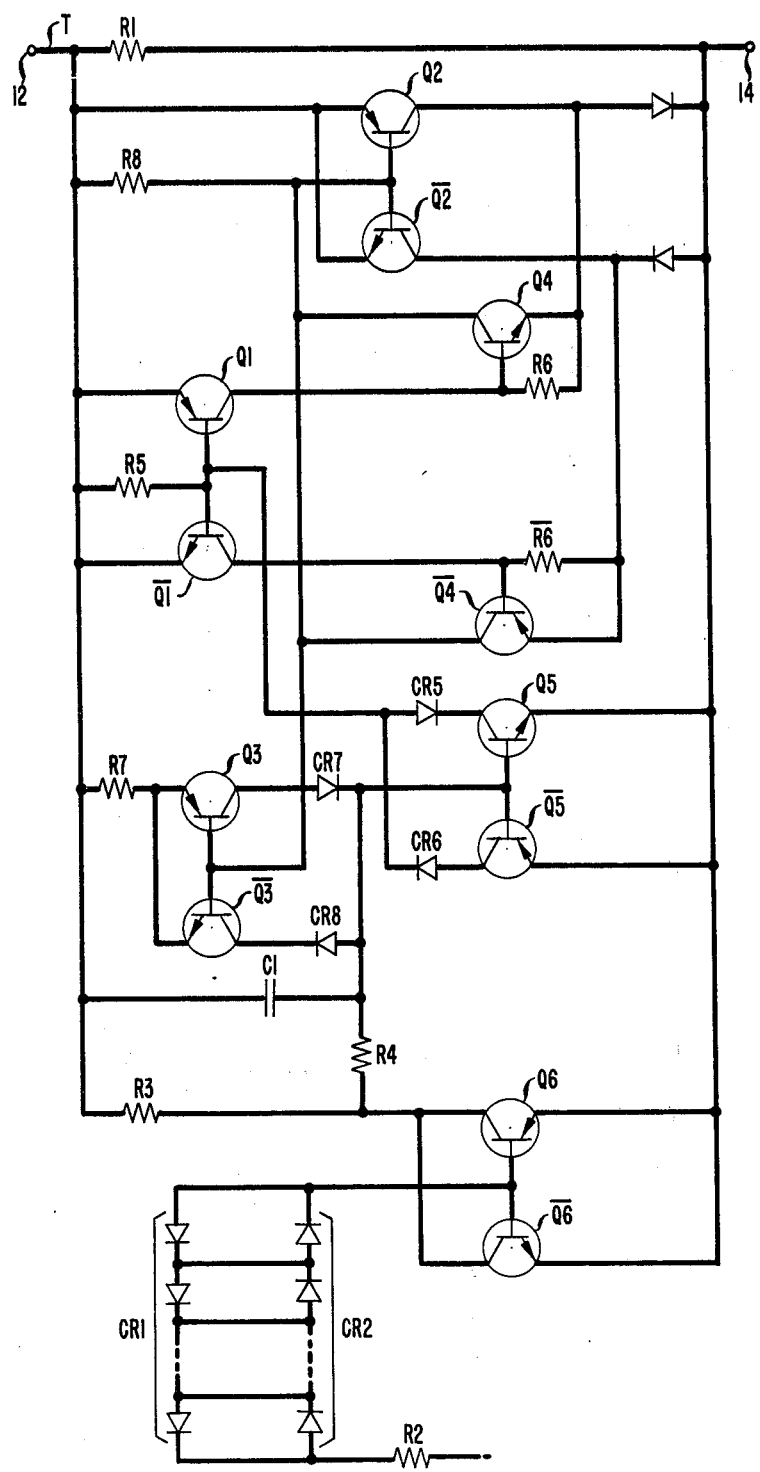
FIG. 2 is a more detailed circuit diagram of one half of an integrated circuit version of the miniature bridge lifter shown in FIG. 1.

Referring then to FIG. 2 of the drawings, there is shown a detailed circuit diagram of only the upper half of a bridge lifter similar to that shown in FIG. 1. In FIG. 2 each transistor of FIG. 1 has been replaced with a pair of transistors connected in parallel and comprising PNP-NPN pairs. Moreover, unilaterally conducting diodes, such as diodes CR3 through CR8, have been added to the circuit to ensure that the nonconducting transistors are completely removed from the circuit. In FIG. 2, diode CR1 has been replaced with a string of diodes sufficient in number to provide the required voltage drop. A similar string of diode CR2, poled in the opposite direction, are connected in parallel with diodes CR1 for currents flowing in the opposite direction.

The operation of the circuit of FIG. 2 is identical to that described in connection with FIG. 1, except that in FIG. 2 the entire circuit is bi-directional and will operate regardless of the polarity of the voltage across terminals 12 and 13. One transistor of each complementary pair is identified in FIG. 2 with the same reference numeral as is used in FIG. 1. The other transistor of the complementary pair is identified with that same reference numeral but with a bar over the reference numeral. The transistors Q6 are special purpose transistors having a reverse gain of at least two in order to ensure saturation should the on-hook voltage be as low as 7 or 8 volts. This reverse gain characteristic can be obtained, as is well known in the art, by suitable doping profiles and device areas, or by utilizing lateral devices.

The complete bridge lifter circuit, only half of which is depicted in FIG. 2, can be readily integrated, thereby providing a very small and inexpensive bridge lifter. This bridge lifter can be connected in the subscriber loop at the main distributing frame in the central office with only the four connection terminals being used. Thus no separate mounting arrangements or jumper wiring are required for circuits requiring bridge lifters.

Exemplary values for the components in FIG. 2 are given in the following table:

Values

R1 = 10K ohms
R2 = 500K ohms
R3 = 4M ohms
R432 600K ohms
R532 50K ohms
R6 = R̄6 = 10K ohms
R7 = 60K ohms
R8 = 300 ohms
C1 = 50 pf.

We claim:

1. An automatic bridge lifting circuit responsive to signal levels in a telephone circuit to provide a low impedance shunt across a series impedance in that circuit
   a two-terminal voltage detection circuit bridged across said telephone circuit and responsive to the voltage level across said telephone circuit to enable said low impedance shunt.
2. The bridge lifting circuit according to claim 1
   said voltage detection circuit includes switching means enabled when the voltage in said telephone circuit is high and is disabled when said voltage is low.
3. The bridge lifting circuit according to claim 1
   said detection circuit comprises a plurality a semiconnector junctions having aggregate forward voltage drops exceeding a first voltage level and less than a second voltage level,
   at least one of said junctions controlling said low impedance shunt.
4. The bridge lifting circuit according to claim 3 further
   said one semiconductor junction comprises a transistor having a reverse gain of at least two.
5. The bridge lifting circuit according to claim 1 further
   a regenerative shunt activating circuit responsive to said voltage detection circuit.
6. An automatic bridge lifter for telephone loops bridged on a common transmission line and providing a low loss connection to said line for active ones of said loops
   loop voltage measuring means for providing said low loss connection when the voltage level across said loop falls below a preselected threshold.
7. The bridge lifter according to claim 6
   said measuring means comprises a single shunt connection across said loop including voltage-actuated threshold means and current-activated control means for said low loss connection.
8. The bridge lifter according to claim 7
   said voltage-actuated threshold means comprises at least one semiconductor diode having a significant forward voltage loop.
9. The bridge lifter according to claim 7
   said current-actuated control means comprises at least one transistor having a reverse gain of at least one.
10. An electronic bridge lifter for providing substantial impedance in a bridged telephone loop when said loop is not in use and for providing a much smaller impedance in said bridged telephone loop when said loop is in use, said bridge lifter comprising:
    an isolating impedance,
    a voltage-responsive detection circuit connected across said loop and differentially responsive to in-use and not-in-use voltages across said loop, and
    regenerative switching means enabled by said detection circuit for shunting said isolating impedance.

* * * * *